(12) United States Patent
Mahieux

(10) Patent No.: US 11,719,344 B2
(45) Date of Patent: Aug. 8, 2023

(54) ROD PACKING

(71) Applicant: Compressor Products International, LLC, Charlotte, NC (US)

(72) Inventor: Pascal Mahieux, Colleret (FR)

(73) Assignee: COMPRESSOR PRODUCTS INTERNATIONAL, LLC, Stafford, TX (US)

( * ) Notice: Subject to any disclaimer, the term of this patent is extended or adjusted under 35 U.S.C. 154(b) by 0 days.

(21) Appl. No.: 17/463,334

(22) Filed: Aug. 31, 2021

(65) Prior Publication Data

US 2022/0120347 A1 Apr. 21, 2022

Related U.S. Application Data

(63) Continuation of application No. 15/592,391, filed on May 11, 2017, now abandoned.

(Continued)

(51) Int. Cl.
*F16J 15/44* (2006.01)
*F04B 53/16* (2006.01)
(Continued)

(52) U.S. Cl.
CPC ......... *F16J 15/442* (2013.01); *F04B 39/0005* (2013.01); *F04B 39/0022* (2013.01);
(Continued)

(58) Field of Classification Search
CPC ...... F04B 53/14; F04B 53/164; F04B 53/144; F04B 53/143; F04B 53/02; F04B 39/045;
(Continued)

(56) References Cited

U.S. PATENT DOCUMENTS 1,008,655 A 11/1911 Lewis et al.
1,819,559 A 8/1931 Jones
(Continued)

FOREIGN PATENT DOCUMENTS

CA 2987650 A1 * 6/2018 ............ F04B 39/041
DE 549572 C * 11/1928 ............... F16J 15/28
(Continued)

OTHER PUBLICATIONS

Extended European Search Report issued in EP Patent Application 17171120.3, dated Oct. 19, 2017, 7 pages.

*Primary Examiner* — Eugene G Byrd
(74) *Attorney, Agent, or Firm* — Edell, Shapiro & Finnan, LLC

(57) ABSTRACT

A tangentially cut rod packing ring is provided. The tangentially cut rod packing ring comprises a first ring formed from a plurality of segments. Each of the segments has a portion of two interfaces where each interface slidably engages an interface of an adjacent segment. One interface terminates at a leading surface. One interface has a stop surface. The leading surface is originally separated from the stop surface by a gap. As the interfaces slidably move, the gap lessens until the leading surface abuts the stop surface. The tangentially cut rod packing ring also comprises a second ring formed from a plurality of segments. The second ring has a first portion and a second portion. The first portion forms as shelf on which the first ring sits. The second portion surrounds the first ring. An elastic member in a groove on the outer surface of the second portion provides a compressive force on both the second ring and the first ring.

20 Claims, 5 Drawing Sheets

Related U.S. Application Data

(60) Provisional application No. 62/337,635, filed on May 17, 2016.

(51) Int. Cl.
    *F04B 53/14*       (2006.01)
    *F04B 39/00*       (2006.01)
    *F04B 53/02*       (2006.01)
    *F04B 39/04*       (2006.01)

(52) U.S. Cl.
    CPC .......... *F04B 39/041* (2013.01); *F04B 39/042* (2013.01); *F04B 39/045* (2013.01); *F04B 53/02* (2013.01); *F04B 53/143* (2013.01); *F04B 53/144* (2013.01); *F04B 53/164* (2013.01); *F04B 53/14* (2013.01)

(58) Field of Classification Search
    CPC .. F04B 39/042; F04B 39/041; F04B 39/0022; F04B 39/0005; F16J 15/442
    See application file for complete search history.

(56) References Cited

U.S. PATENT DOCUMENTS

| | | | |
|---|---|---|---|
| 1,837,115 A | 12/1931 | Cook | |
| 1,879,855 A | 9/1932 | Morton | |
| 2,055,153 A | 9/1936 | Madsen | |
| 2,191,265 A | 2/1940 | Wheeler | |
| 3,066,944 A | 12/1962 | Ambiard et al. | |
| 3,235,274 A | 2/1966 | Cain et al. | |
| 3,305,241 A | 2/1967 | Hart | |
| 3,490,774 A | 1/1970 | Henry et al. | |
| 3,711,104 A | 1/1973 | Henry | |
| 3,874,679 A * | 4/1975 | Kaller | F04B 39/041 277/589 |
| 4,469,017 A * | 9/1984 | Hanlon | F16J 15/008 91/461 |
| 4,627,795 A * | 12/1986 | Schmitz-Montz | F04B 25/00 417/267 |
| 5,217,232 A | 6/1993 | Makhobey | |
| 5,509,664 A * | 4/1996 | Borkiewicz | F16J 15/442 277/543 |
| 6,439,578 B1 | 8/2002 | Radcliffe | |
| 6,932,351 B1 * | 8/2005 | Mowll | F04B 39/0022 277/517 |
| 6,959,930 B2 | 11/2005 | Wood | |
| 8,162,325 B2 | 4/2012 | Linder-Silwester et al. | |
| 2002/0145259 A1 * | 10/2002 | Chalk | F16J 15/164 277/447 |
| 2006/0061040 A1 * | 3/2006 | Nicholson | F16J 15/442 277/355 |
| 2009/0020959 A1 | 1/2009 | Shaw et al. | |
| 2009/0121440 A1 * | 5/2009 | Feistel | F16J 15/445 277/308 |
| 2009/0179386 A1 | 7/2009 | Linder-Silwester | |
| 2010/0164180 A1 * | 7/2010 | Short | F16J 15/3448 277/370 |
| 2012/0211945 A1 * | 8/2012 | Lindner-Silwester | F04B 39/041 277/508 |
| 2013/0154197 A1 * | 6/2013 | Feistel | F16J 9/06 277/449 |
| 2016/0305551 A1 * | 10/2016 | Koop | F04B 39/041 |
| 2017/0307019 A1 * | 10/2017 | Vicogne | F16C 33/74 |
| 2017/0335972 A1 | 11/2017 | Mahieux | |
| 2018/0372225 A1 * | 12/2018 | Ruggeri | F16J 15/442 |
| 2020/0102946 A1 * | 4/2020 | Chalk | F04B 39/128 |
| 2020/0332900 A1 * | 10/2020 | Chalk | F16J 15/3452 |
| 2022/0099183 A1 * | 3/2022 | Spiegl | F04B 39/12 |
| 2022/0136494 A1 * | 5/2022 | Spiegl | F04B 39/041 417/481 |

FOREIGN PATENT DOCUMENTS

| | | |
|---|---|---|
| DE | 549572 C | 4/1932 |
| DE | 102006015327 | 10/2007 |
| EP | 1197632 A2 | 4/2002 |
| GB | 1071612 A | 6/1967 |

\* cited by examiner

ROD PACKING

CROSS-REFERENCE TO RELATED PATENT APPLICATIONS

The present application is a continuation of U.S. patent application Ser. No. 15/592,391, filed May 11, 2017, which claims priority to U.S. Provisional Patent Application No. 62/337,635, filed May 17, 2016, the disclosure of which are incorporated herein by reference as if set out in full.

BACKGROUND

Compressors and other reciprocating pumps generally have a piston rod that moves into and out of a high (or low) pressure system. The pathway that the piston rod follows provides a natural leak path for the fluid (gas or liquid) into or out of the cylinder. Rod packing has been designed to at least inhibit the leakage.

Rod packing has changed and improved over the years. One significant improvement in packing was a tangential joint packing ring 100 as shown in FIG. 1A. The tangential joint packing ring 100 is typically segmented. This example shows the tangential joint packing ring 100 to be in three (3) identical pieces $102_{1-3}$. The interfaces 104 or cuts lie on the side of a triangle. The original inner diameter $D_o$ of the tangential joint packing ring 100 is designed to operationally mate with the outer diameter of the corresponding piston rod (not specifically shown in FIG. 1A). The internal surface 106 of the tangential joint packing ring 100 is generally not contiguous, but each segment has a gap 108.

An elastic member 110 (see FIG. 2), such as a metallic garter spring or the like, extends around the outer diameter 112 of the tangential joint packing ring 100. Typically, the elastic member 110 is contained in a groove 200 on the outer surface 114 (see FIG. 2). The elastic member 110 provides a compressive force. As the packing ring wears over time, the elastic member 110 squeezes the tangential joint packing ring 100 causing the pieces 102 to slide with respect to each other, which reduces the gap's radial width. Eventually, the wear causes the pieces 102 to slide until the gap 108 closes and the pieces 102 abut as shown in FIG. 1B, at which time the packing (and possibly the piston rod) needs to be replaced. Importantly, the final inner diameter ID is operationally designed to mate with the outer diameter of the piston rod (regardless of whether the piston rod has suffered wear).

As can be appreciated, the interfaces and gaps provide a leak path. A second ring 202 is provided, as shown in FIG. 2, such that the tangentially cut packing ring 100 and the second ring 202 form a packing ring set 210. The second ring 202 would be segmented into identical pieces. Further, an elastic member 204 would reside in a groove 206 on an outer surface 208 of the second ring. By design, the interfaces on the second ring 202 (which are radial cuts but otherwise similar to the ones described above and not shown here) would not overlap with the interfaces 104 and gaps 108 of the tangentially cut packing ring 100. This arrangement seals the leak paths formed by the cuts and gaps.

While generally two separate rings, the tangentially cut packing ring 100 and second ring 202 are sometimes joined as a connected version of a radial-tangent ring pair.

Although functional, improvements in rod packing are necessary. In one aspect, longer life in view of the wear of the rings is desirous. Thus, against this background, an improved rod packing ring is provided.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some aspects of the technology, a tangentially cut rod packing ring is provided. The tangentially cut rod packing ring comprises a first ring formed from a plurality of segments. Each of the segments has a portion of two interfaces where each interface slidably engages an interface of an adjacent segment. One interface terminates at a leading surface. One interface has a stop surface. The leading surface is originally separated from the stop surface by a gap. As the interfaces slidably move, the gap lessens until the leading surface abuts the stop surface. The tangentially cut rod packing ring also comprises a second ring formed from a plurality of segments. The second ring has a first portion and a second portion. The first portion forms as shelf on which the first ring sits. The second portion surrounds the first ring. An elastic member in a groove on the outer surface of the second portion provides a compressive force on both the second ring and the first ring.

In certain embodiments, a packing ring set for a rod comprises a first ring comprising a plurality of segments formed by tangential cuts along a first ring segment interface between each of the plurality of segments wherein each of the plurality of segments is slidably movable along the first ring segment interface, the first ring having a first ring inner diameter and a first ring outer diameter; a second ring having an outer surface comprising a plurality of segments formed by tangential cuts along a second ring interface between each of the plurality of segments wherein each of the plurality of segments is slidably movable along the second ring segment interface, the second ring comprising: a first portion having a first portion inner diameter and a first portion outer diameter a second portion having a second portion inner diameter substantially equal to the first ring outer diameter and a second portion outer diameter substantially equal to the first portion outer diameter such that the first portion and second portion together form a shelf sized to accommodate the first ring; a groove formed on the outer surface of the second ring; and an elastic member disposed in the groove providing a compressive force on the second ring and the first ring.

In certain aspects, the elastic member comprises a spring. In certain aspects, the elastic member comprises an o-ring.

In certain aspects, the first ring segment interface each have a leading surface and a stop surface such each leading surface has a corresponding stop surface such that the plurality of segments slidably move with respect to each other until at least one leading surface abuts at least one stop surface.

In certain aspects, the second ring segment interface each are through cuts.

In certain embodiments, the first portion inner diameter is substantially equal to the first ring inner diameter. In other embodiments, the first portion inner diameter is greater than the first ring inner diameter.

The first ring further has a gap that initially separates the leading surface from its corresponding stop surface. In certain embodiments, the gap initially separating the leading surface from its corresponding stop surface is between 1 and 10 millimeters. In certain embodiments is greater than 4 millimeters. In certain embodiments, the gap is between 4 millimeters and 10 millimeters. In certain embodiments, the gap is between 6 and 8 millimeters. In certain embodiments, the gap is no more than 8 millimeters. In certain embodiments, the gap is about 8 millimeters.

In certain aspects an apparatus is provided. The apparatus comprises a piston rod moving between a high pressure and a low pressure; and a packing ring set for the rod, comprising: a first ring comprising a plurality of segments formed by tangential cuts along a first ring segment interface between each of the plurality of segments wherein each of the plurality of segments is slidably movable along the first ring segment interface, the first ring having a first ring inner diameter and a first ring outer diameter; a second ring having an outer surface comprising a plurality of segments formed by tangential cuts along a second ring interface between each of the plurality of segments wherein each of the plurality of segments is slidably movable along the second ring segment interface, the second ring comprising: a first portion having a first portion inner diameter and a first portion outer diameter a second portion having a second portion inner diameter substantially equal to the first ring outer diameter and a second portion outer diameter substantially equal to the first portion outer diameter such that the first portion and second portion together form a shelf sized to accommodate the first ring; a groove formed on the outer surface of the second ring; and an elastic member disposed in the groove providing a compressive force on the second ring and the first ring.

These and other aspects of the present system and method will be apparent after consideration of the Detailed Description and Figures herein.

DRAWINGS

Non-limiting and non-exhaustive embodiments of the present invention, including the preferred embodiment, are described with reference to the following figures, wherein like reference numerals refer to like parts throughout the various views unless otherwise specified.

Figure 1A:
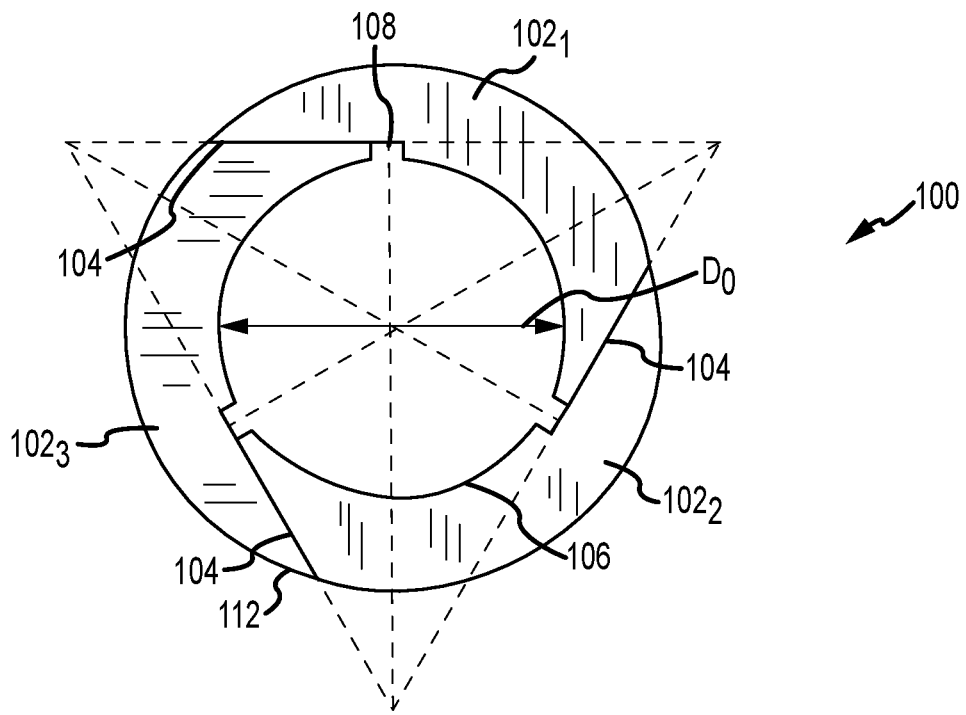
FIG. 1A is a plan view of a tangentially cut packing ring consistent with the prior art.
Figure 1B:
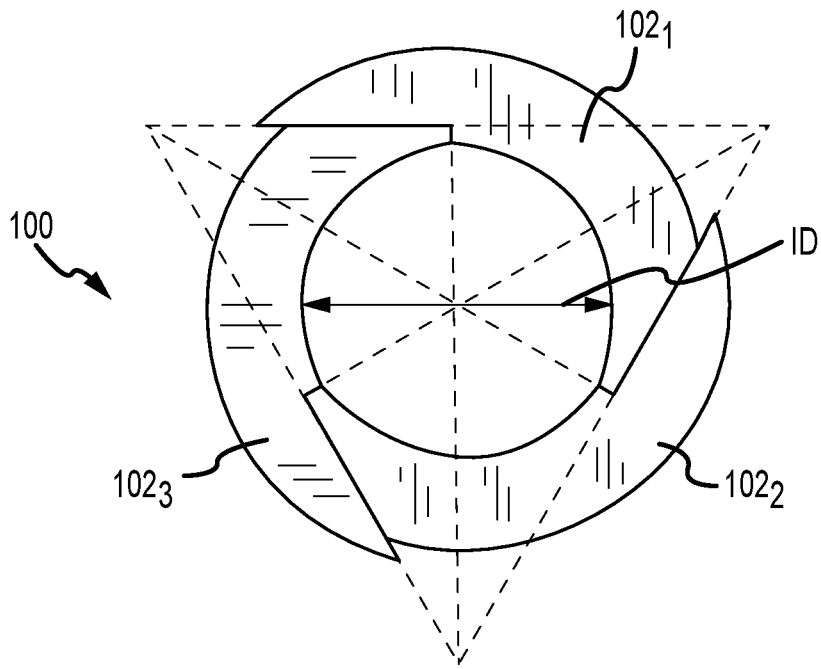
FIG. 1B is a plan view of a tangentially cut packing ring consistent with the prior art.
Figure 2:
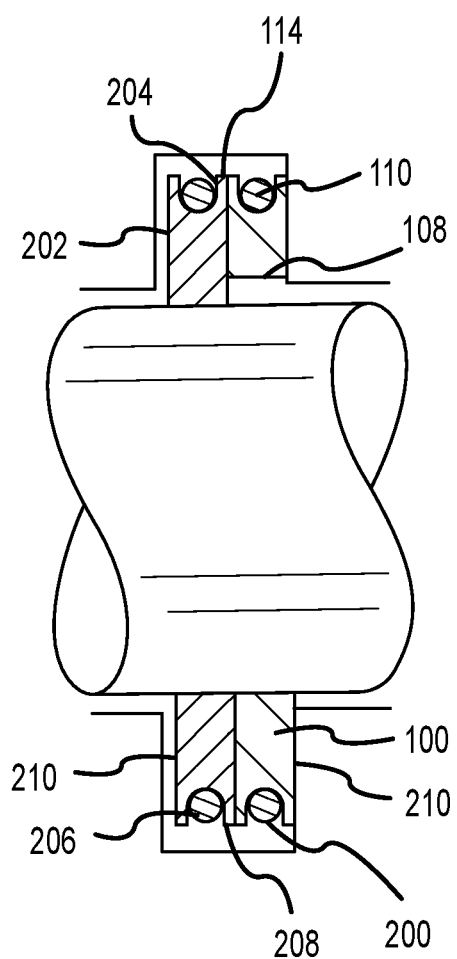
FIG. 2 is a view of the tangentially cut packing ring of FIG. 1 and a secondary radial cut ring on a rotor.
Figure 3:
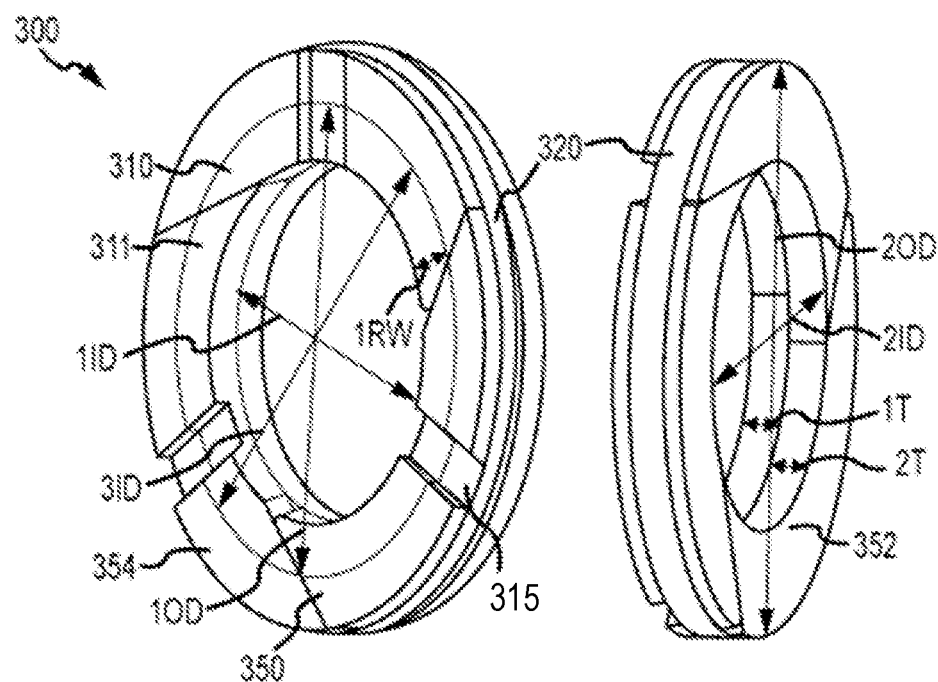

FIG. 3 provides perspective views of the tangentially cut packing ring consistent with the technology of the present application.

Figure 4:
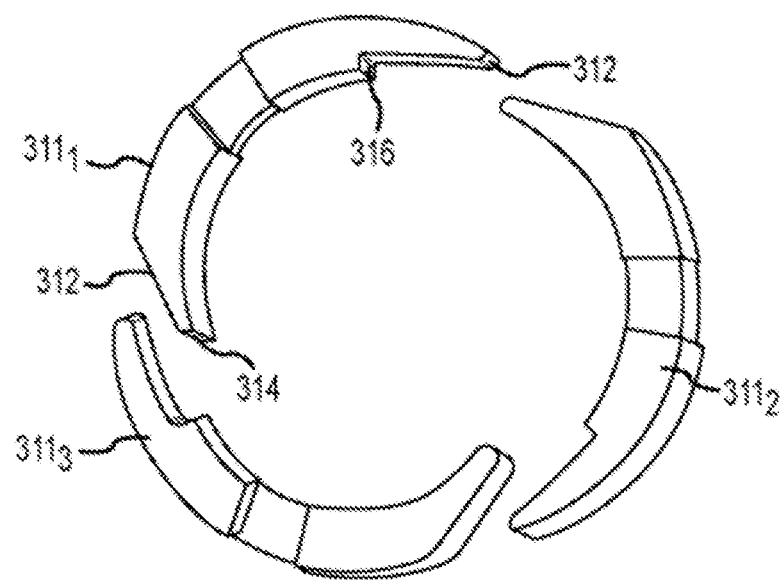

FIG. 4 shows a segment of the first ring of FIG. 3.

Figure 5:
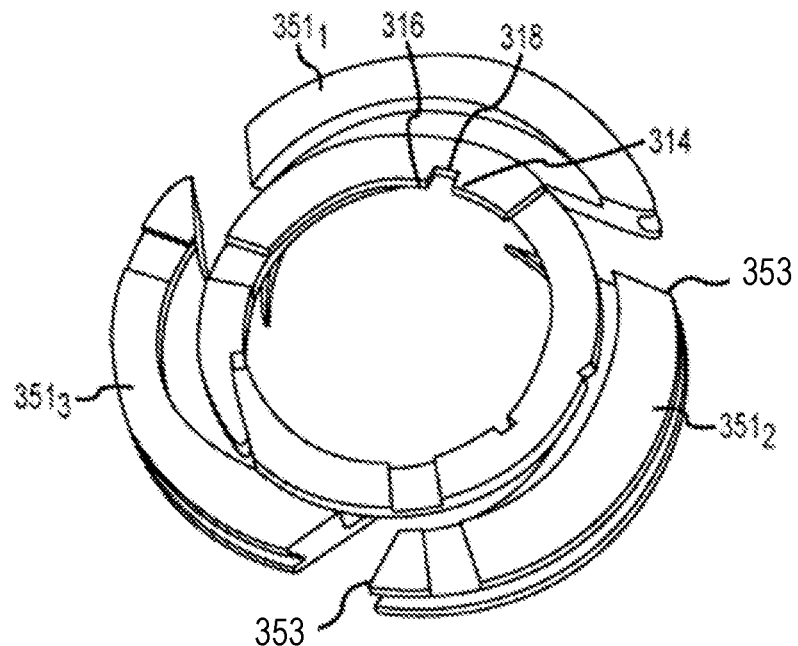

FIG. 5 is a partially exploded view of the tangentially cut packing ring of FIG. 3.

Figure 6:
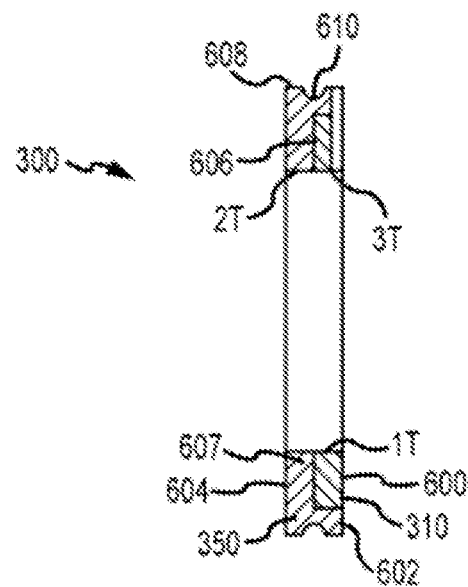

FIG. 6 is a cross-sectional view of a portion of the tangentially cut packing ring of FIG. 3 (without the elastic member).

Figure 7:
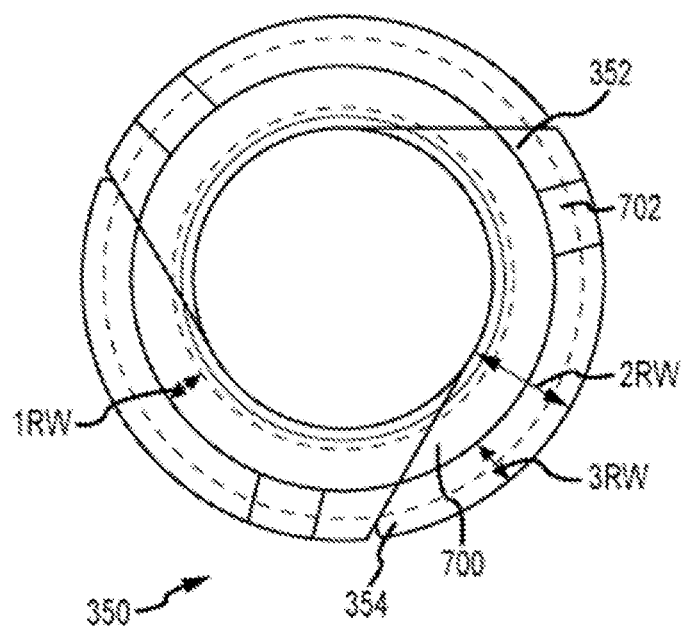
Figure 8:
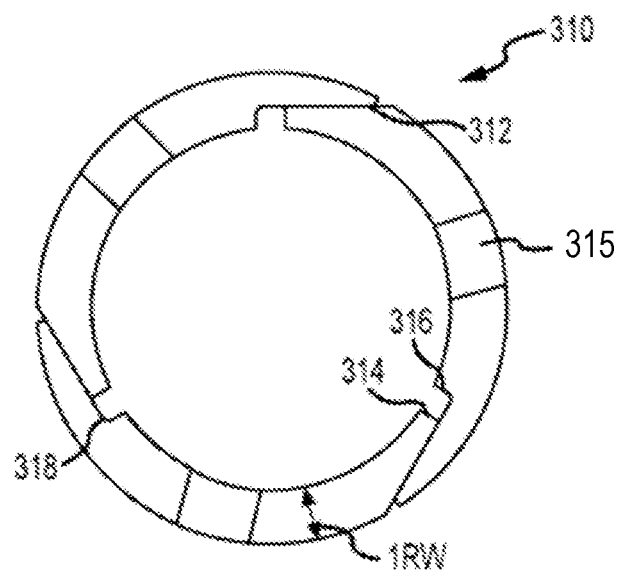

FIGS. 7 and 8 are side-by-side plan views of the first ring and the second ring of the tangentially cut packing ring of FIG. 3.

DETAILED DESCRIPTION

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with specific reference to rod packing for gas compressors. However, the technology described herein may be used for other devices where a rod or stem exits a pressure vessel, such as a liquid compressor, a fluid pump, a valve stem, the like. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

With reference now to FIG. 3, a tangential rod packing ring 300 consistent with the technology is provided. The tangential rod packing ring 300 comprises a first ring 310. The first ring 310 comprises a first inner diameter 1ID and a first outer diameter 1OD. The first ring 310 has a first radial width 1RW, which is 1OD-1ID, and a first axial thickness 1T. As will be explained below, the first ring 310 has three segments 311 that slidably abut along interfaces 312 (see FIG. 4). Each segment 311 has at least one radial extending relief channel 315 or groove 315.

With continued reference to FIG. 3, the first ring 310 is set into a second ring 350. Axially, the second ring 350 comprises a first portion 352 and a second portion 354. The first portion has a second inner diameter 2ID, which is equal to the first inner diameter 1ID, and the second portion 354 has a third inner diameter 3ID, which is equal to the first outer diameter 1OD. The second ring 350 also comprises a second outer diameter 2OD, which is shown as consistent for both the first portion 352 and the second portion 354. The first portion 352 of the second ring 350 has a second axial thickness 2T and the second portion 354 of the second ring 350 has a third axial thickness 3T (see FIG. 6). The maximum axial thickness of the second ring 350 comprises 2T+3T. In this exemplary embodiment, the first axial thickness 1T, the second axial thickness 2T, and the third axial thickness 3T are all equal (see FIG. 6).

As can be appreciated, in certain embodiments, first portion 352 may have an inner diameter 2ID that is slightly larger than the inner diameter 1ID of the first ring 310. This would provide that a portion of the first ring 310 contacting the rod may overhang the shelf 607 (shelf 607 shown in FIG. 6).

The second ring 350 in certain aspects may be held open by the segments 311 of the first ring 310. This may facilitate easier installation on the rod.

FIG. 4 shows segments $311_{1-3}$, such as segment $311_1$ in detail. The segments $311_{2,3}$ would be identical and will not be described herein. The segment $311_1$ includes a first and a second interface surface 312 to slidably engage a corresponding interface surface in the segments $311_{2,3}$. One interface surface 312 terminates at a leading surface 314. The other interface surface 312 terminates at a stop surface 316. As the elastic member (described below) compresses the segments 311, the leading surface 314 eventually abuts the stop surface 316 of an adjacent segment 311.

The original configuration of the tangential rod packing ring 300 is such that the first ring 310 has leading surfaces 314 separated from the stop surfaces 316 by gaps 318 (see FIG. 5). The second ring 350, shown partially exploded, also is formed into segments 351 1-3. The segments 351 1-3 of the second ring are tangentially cut such that each segment includes a first and a second interface surface 353. The first and second interface surfaces 353 are through cuts and do not terminate at a leading surface or a stop surface as explained above with respect to the first ring 310. As such, the second ring 350 will continue to compress until the first ring 210 is stopped by leading surfaces 314 abutting stop surfaces 316. The tangential cuts on the first ring 310 and the second ring 350 offset by a few degrees around the circumference such that the gap 318 does not provide a leak path. Generally, the offset is set such that the interfaces or interface surfaces 312 and 353 are parallels. Combining two tangential rod packing rings may provide for better sealing than conventional packing ring sets.

Also, the gap 318 separating the segments 311 of the first ring 310 may be larger for the tangentially cut packing ring 300 of the present application than a conventional ring. Conventionally, the gap is no more than about 3 millimeters. This limit is generally due to breakage in view of the edges of the parts. The capture of the first ring 310 in the second ring 350 provides support for the first ring 310 parts. This allows the gap 318 to be expanded initially to 4, 5, 6, 7, or perhaps even 8 or 10 millimeters. The larger gap 318 allows for a longer run life as it allows for more wear.

FIG. 6 shows a cross-sectional view of the tangential rod packing ring 300. The tangential rod packing ring 300 includes the first ring 310, on the pressure, pump, or cylinder facing side 600 (sometimes referred to as forward facing), and the second ring 350 having both a forward facing side 602 and a back facing side 604. The first ring 310 also comprises a back facing side 606 that is flush with the shelf 607 (sometimes referred to as a ledge or shoulder) formed in the second ring, which is explained below. The second ring includes an outer surface 608 that includes a groove 610. An elastic member 320 (shown in FIG. 3), such as the elastic member 204 explained above, provides a compressive force tending to squeeze the tangential rod packing ring 300. The outer surface of the first ring 310 abuts an inner surface of the second portion 354 of the second ring 350. The elastic member 320 may be a metallic spring, as mentioned, or a plastic spring. In certain aspects the elastic member 320 may be an o-ring, a plastic (elastic) solid wire spring, or the like.

The compressive force provided by the elastic member 320 is shared by the inner surface of the first ring 310 and the inner surface of the first portion 352 of the second ring 350. Sharing the compressive force of the single elastic member may reduce friction between the rod and the respective inner surfaces, which may result in less heating, wear, and result in a longer life for the tangentially cut packing ring 300. Similarly, the first ring 310 may engage the rod individually (when the inner diameter HD is less than the inner diameter 2ID) to allow some initial wear prior to the inner surface of the second ring 350 engaging the rod. Lifting the second ring 350 off the rid may prolong the life of the tangentially cut rod packing ring 300.

FIG. 6 generally shows that the inner diameter 3ID of the second portion 354 of the second ring 350 is substantially equal to the outer diameter 1OD of the first ring 310. In certain embodiments, the inner diameter 3ID may be larger than the outer diameter 1OD. This would allow for a certain amount of wear prior to contact between the outer surface of the first ring 310 and the inner surface of the second portion 354 of the second ring.

FIG. 7 shows a plan view of the tangential rod packing ring 300 with the first ring 310 removed from the second ring 350, but the first ring 310 is shown in FIG. 8 for a side-by-side view. The first portion 352 of the second ring 350 has a second radial width of 2RW and the second portion 354 of the second ring 350 has a third radial width 3RW. The second radial width 2RW is greater than the third radial width 3RW, and the second radial width 2RW is equal to 1RW+3RW. The first portion 352 extends inwardly from the second portion 354 forming a contiguous shelf 700 having a radial width equal to 1RW such that the first ring 310 rests on the shelf 700 and the outer surface of the first ring 310 abuts the inner surface of the second portion 354. The elastic member 320 squeezes the second ring 350, and the compressive force is transmitted through the second ring 350 to the first ring by the inner surface of the second portion 354 pushing on the outer surface of the first ring 310. While shown as contiguous, the shelf 700 may be segmented in certain embodiments.

The second portion 354 has at least one radial extending relief 702. The radial extending relief 702 in the second portion 354 corresponds to the relief 315 in the first ring 310. The reliefs 315 and 702 allow for pressure relief.

Because the second ring 350 encapsulates the first ring 310, it may be possible to use the second ring 350 as an anti-extrusion ring by incorporating the correct materials. Also, the elastic member 320 may comprise non-metallic material including an o-ring, a plastic (elastic) solid wire spring, or the like. The design, allowing for non-metallic material, may decrease rod damage.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

The invention claimed is:

1. A packing ring set for a rod, comprising:
a first ring having an inner diameter, an outer diameter, a radial width equal to the outer diameter less the inner diameter, and a first axial thickness, the first ring comprising:
a plurality of segments, each of the plurality of segments including an interface surface that extends between a leading surface and a stop surface, each of the plurality of segments also including a radially extending relief channel formed therein, the interface surface extending tangentially from the radially extending relief channel, such that each of the plurality of segments is slidably movable along the interface surface until its leading surface abuts a stop surface on an adjacent one of the plurality of segments;
a second ring comprising:
a first portion having a first portion inner diameter and a first portion outer diameter, the first portion inner diameter being substantially equal to the first ring inner diameter; and
a second portion having a second portion inner diameter substantially equal to the first ring outer diameter and a second portion outer diameter substantially equal to the first portion outer diameter, the second portion having an outer surface with a groove formed therein, the first portion and second portion together form a shelf sized to accommodate the first ring, the shelf portion has a second axial thickness equal to the first axial thickness, and the first portion and second portion together have a third axial thickness equal to the first axial thickness plus the second axial thickness;
wherein the second ring is formed into a plurality of segments, each of the plurality of segments of the second ring includes a pair of interface surfaces at opposite ends of the segment, each of the interface surfaces is a tangential through cut and does not terminate at any of the leading surfaces or stop of the first ring; and
an elastic member disposed in the groove providing a compressive force on the second ring and the first ring.

2. The packing ring set of claim 1 wherein the elastic member comprises a spring.

3. The packing ring set of claim 1 wherein the elastic member comprises an o-ring.

4. The packing ring set of claim 1 wherein the first portion inner diameter is greater than the first ring inner diameter such that the first ring is initially configured to seal a rod.

5. The packing ring set of claim 1 wherein for each of the plurality of segments of the first ring, a gap initially separates the leading surface of one of the plurality of segments from a stop surface of an adjacent one of the plurality of segments, and each gap is no more than 10 millimeters.

6. The packing ring set of claim 5 wherein one of the gaps is between 1 and 10 millimeters.

7. The packing ring set of claim 5 wherein one of the gaps is greater than 4 millimeters.

8. The packing ring set of claim 5 wherein one of the gaps is between 4 millimeters and 10 millimeters.

9. The packing ring set of claim 5 wherein one of the gaps is between 6 millimeters and 8 millimeters.

10. The packing ring set of claim 5 wherein one of the gaps is about 8 millimeters.

11. An apparatus comprising:
a piston rod moving between a high pressure and a low pressure; and
a packing ring set for the rod, comprising:
a first ring having an inner diameter, an outer diameter, a radial width equal to the outer diameter less the inner diameter, and a first axial thickness, the first ring comprising:
a plurality of segments, each of the plurality of segments including an interface surface that extends between a leading surface and a stop surface, each of the plurality of segments also including a radially extending relief channel formed therein, the interface surface extending tangentially from the radially extending relief channel, such that each of the plurality of segments is slidably movable along the first ring segment interface surface until its leading surface abuts a stop surface on an adjacent one of the plurality of segments,
a second ring comprising:
a first portion having a first portion inner diameter and a first portion outer diameter, the first portion inner diameter being substantially equal to the first ring inner diameter; and
a second portion having a second portion inner diameter substantially equal to the first ring outer diameter and a second portion outer diameter substantially equal to the first portion outer diameter, the second portion having an outer surface with a groove formed therein, the first portion and the second portion together form a shelf sized to accommodate the first ring, the shelf portion has a second axial thickness equal to the first axial thickness, and the first portion and second portion together have a third axial thickness equal to the first axial thickness plus the second axial thickness;
wherein the second ring is formed into a plurality of segments, each of the plurality of segments of the second ring includes a pair of interface surfaces at opposite ends of the segment, each of the interface surfaces is a tangential through cut and does not terminate at any of the leading surfaces or stop of the first ring; and
an elastic member disposed in the groove providing a compressive force on the second ring and the first ring.

12. The packing ring set of claim 11, wherein the elastic member comprises a spring.

13. The packing ring set of claim 11, wherein the elastic member comprises an o-ring.

14. The packing ring set of claim 11, wherein the first portion inner diameter is greater than the first ring inner diameter such that the first ring is initially configured to seal a rod.

15. The packing ring set of claim 11, wherein for each of the plurality of segments of the first ring, a gap initially separates the leading surface of one of the plurality of segments from a stop surface of an adjacent one of the plurality of segments, and each gap is no more than 10 millimeters.

16. The packing ring set of claim 15, wherein one of the gaps is between 1 and 10 millimeters.

17. The packing ring set of claim 15, wherein one of the gaps is greater than 4 millimeters.

18. The packing ring set of claim 15, wherein one of the gaps is between 4 millimeters and 10 millimeters.

19. The packing ring set of claim 15, wherein one of the gaps is between 6 millimeters and 8 millimeters.

20. The packing ring set of claim 5 wherein one of the gaps is about 8 millimeters.

\* \* \* \* \*